US008964586B2

(12) United States Patent
Xhafa et al.

(10) Patent No.: US 8,964,586 B2
(45) Date of Patent: Feb. 24, 2015

(54) ENHANCED QOS SUPPORT USING BLUETOOTH LOW ENERGY

(75) Inventors: Ariton E. Xhafa, Plano, TX (US); Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 278 days.

(21) Appl. No.: 13/566,540

(22) Filed: Aug. 3, 2012

(65) Prior Publication Data

US 2013/0034005 A1 Feb. 7, 2013

Related U.S. Application Data

(60) Provisional application No. 61/515,697, filed on Aug. 5, 2011.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04J 3/16* (2006.01)
*H04L 12/42* (2006.01)
*H04L 12/403* (2006.01)
*H04B 7/00* (2006.01)
*H04W 76/02* (2009.01)
*H04W 84/18* (2009.01)

(52) U.S. Cl.
CPC .............. *H04W 76/02* (2013.01); *H04W 84/18* (2013.01)

USPC ........... 370/252; 370/346; 370/449; 455/41.2

(58) Field of Classification Search
USPC .......................... 370/252, 346, 449; 455/67.3
See application file for complete search history.

(56) References Cited

U.S. PATENT DOCUMENTS

| 8,565,109 | B1 * | 10/2013 | Poovendran et al. ......... 370/252 |
| 2002/0019966 | A1 * | 2/2002 | Yagil et al. .................... 714/752 |
| 2004/0156351 | A1 * | 8/2004 | Kim ............................... 370/349 |
| 2005/0135409 | A1 * | 6/2005 | Janczak ......................... 370/449 |
| 2006/0140166 | A1 * | 6/2006 | Albulet .......................... 370/346 |
| 2007/0173270 | A1 * | 7/2007 | Block et al. ................... 455/507 |
| 2008/0043661 | A1 * | 2/2008 | Park .............................. 370/314 |
| 2008/0207126 | A1 * | 8/2008 | Grushkevich et al. ....... 455/41.2 |
| 2009/0034526 | A1 * | 2/2009 | Ahmadi et al. ............... 370/392 |

(Continued)

*Primary Examiner* — Alpus H Hsu
*Assistant Examiner* — Yee Lam
(74) *Attorney, Agent, or Firm* — Steven A. Shaw; Frederick J. Telecky, Jr.

(57) ABSTRACT

Embodiments support stringent Quality of Service (QoS) requirements using adaptations to the existing Bluetooth Low Energy (BLE) protocols. In systems using an enhanced BLE protocol, the master send a poll frame at selected connection intervals or poll intervals. The duration of the connection interval and/or poll interval may be calculated based upon desired QoS parameters, such as delay, target packet error rate (PER), frame error rate (FER), and/or jitter. The master may consider the connection interval lost if a frame is not received from the slave after a predetermined number (m) of consecutive poll frames are transmitted. The value m may be set relatively high to provide more robustness in the system. However, the poll interval may also need to be adjusted to meet QoS requirements. The slave may be required to transmit a packet—that may or may not carry data—in response to every $m^{th}$ received poll.

10 Claims, 4 Drawing Sheets

(56) References Cited

U.S. PATENT DOCUMENTS

| | | | |
|---|---|---|---|
| 2010/0157961 A1* | 6/2010 | Ji et al. | 370/338 |
| 2010/0235666 A1* | 9/2010 | Fan et al. | 713/323 |
| 2010/0317289 A1* | 12/2010 | Desai et al. | 455/41.2 |
| 2013/0017816 A1* | 1/2013 | Talty et al. | 455/418 |

* cited by examiner

ENHANCED QOS SUPPORT USING BLUETOOTH LOW ENERGY

CROSS-REFERENCE TO RELATED APPLICATIONS

This application claims the benefit of the filing date of U.S. Provisional Patent Application No. 61/515,697, which is titled "Methods to Enhance QOS Support using Bluetooth Low Energy" and was filed Aug. 5, 2011, the disclosure of which is hereby incorporated by reference herein in its entirety.

BACKGROUND

In systems employing the Bluetooth Low Energy (BLE) protocol, devices are designated as either master or slave. When a connection is established, the master device supplies the slave device with data defining the channel and timing of data exchange between the master and slave. This data specifies a connection interval and a slave latency among other parameters. The connection interval establishes the time between the start of a data packet exchange sequence called a connection event. Latency defines the number of communication intervals that may be missed or ignored by the slave before losing the connection.

Communication events are started by the master and then the master and slave alternate sending and receiving packets until either side stops sending packets. The master begins by transmitting a poll frame. If the slave has data ready at the Medium Access Control (MAC) level, then it transmits a data frame back to the master in response to the poll. If the slave does not have data available to send when it receives a poll frame from the master, then the slave transmits a null data. When data becomes available for transmission at the slave device, it must wait for the next poll before transmitting the data frame.

The master may transmit an acknowledgement frame upon receiving the data frame. If the data transmission from the slave fails, then the slave will resend the data in the same connection interval if a negative acknowledgment is received, otherwise the slave will resend the data in the next connection interval. After a predetermined number of failed or missing transmissions by the slave within the same connection interval, connection interval will be lost.

Because the slave must wait for a poll frame before transmitting data, stringent Quality of Service (QoS) requirements for certain applications may not be supported in a BLE system. In particular, it may be difficult to meet jitter and frame error rate requirements for some applications using the existing BLE protocol.

SUMMARY

The proposed approach provides support for use cases that require stringent Quality of Service (QoS) support. Adaptations to the existing Bluetooth Low Energy (BLE) protocols are disclosed to ensure QoS support. In systems using an enhanced BLE protocol, the master sends a poll frame at selected connection intervals or poll intervals. The duration of the connection interval and/or poll interval may be calculated based upon desired QoS parameters, such as delay, target packet error rate (PER), frame error rate (FER), and/or jitter.

The master may consider the connection interval lost if a frame is not received from the slave after a predetermined number (m) of consecutive poll frames are transmitted. The value m may be set relatively high to provide more robustness in the system. However, the poll interval may also need to be adjusted to meet QoS requirements. The slave may be required to transmit a packet—that may or may not carry data—in response to every $m^{th}$ received poll. The slave may consider the connection interval lost if n-consecutive poll frames have an invalid cyclic redundancy check (CRC) or are not received from the master.

BRIEF DESCRIPTION OF THE DRAWINGS

Figure 1:
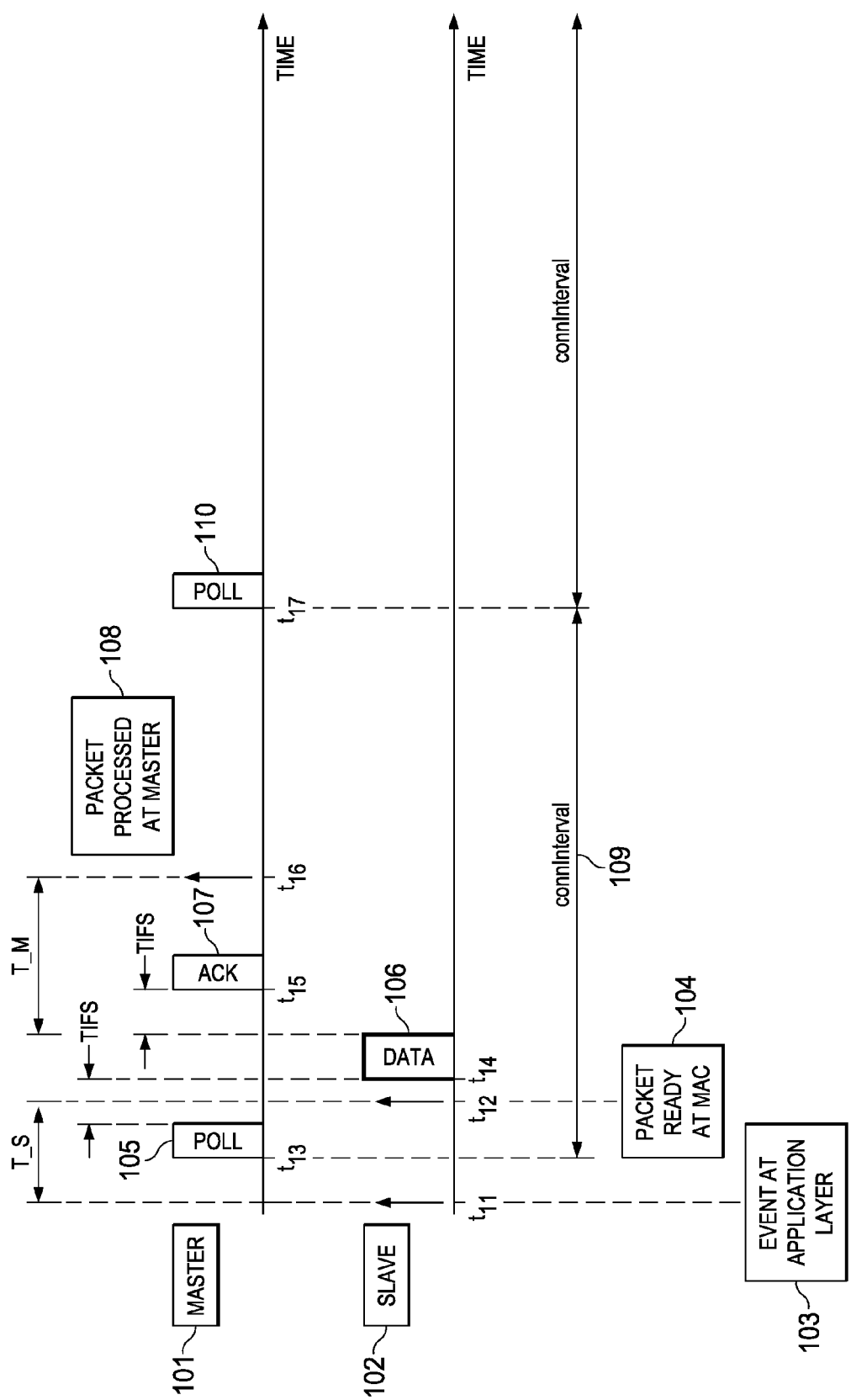

Having thus described the invention in general terms, reference will now be made to the accompanying drawings, wherein:

FIG. 1 illustrates a frame exchange between a master device and a slave device.

Figure 2:
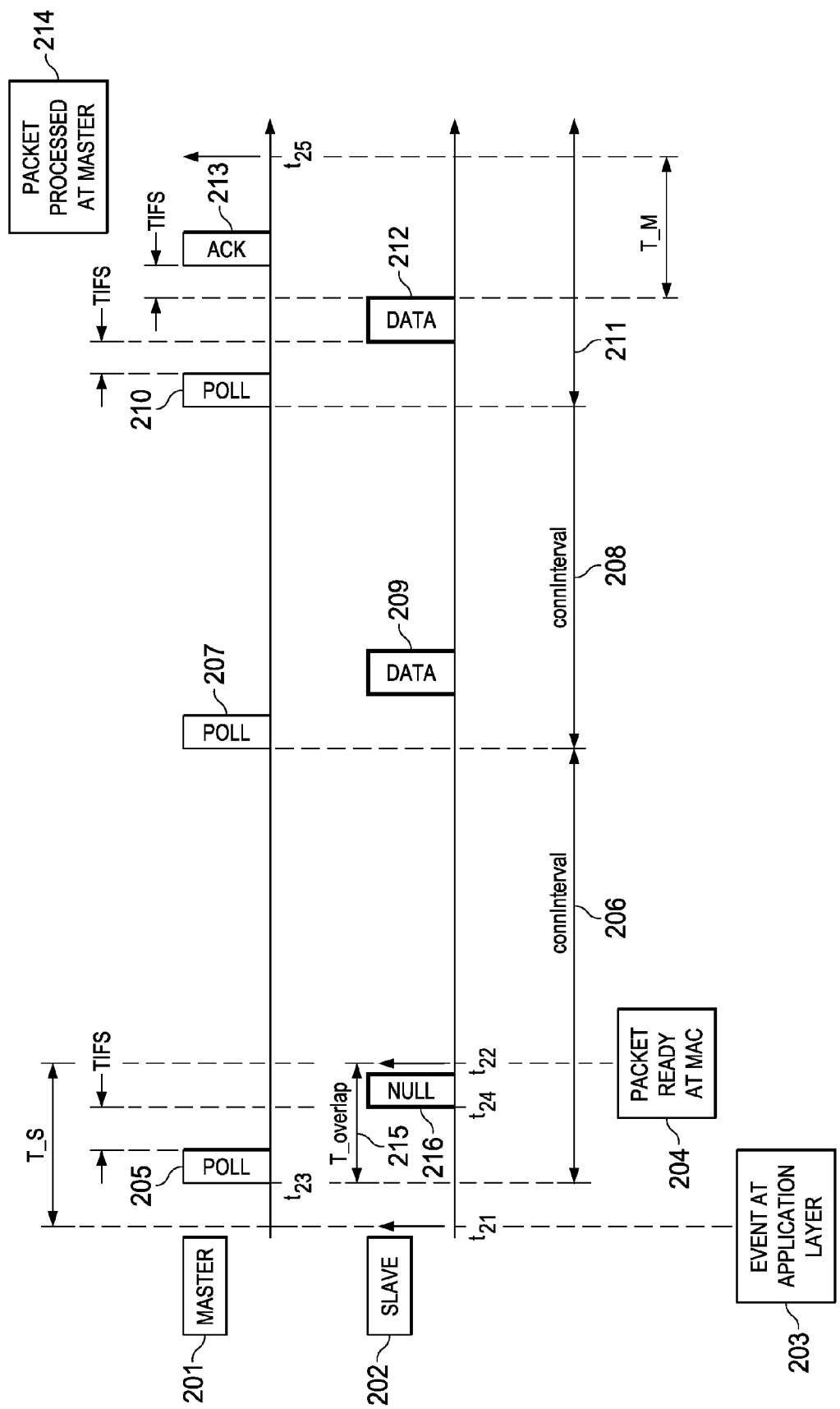

FIG. 2 illustrates a frame exchange between a master device and a slave device with missing and failed slave transmissions.

Figure 3:
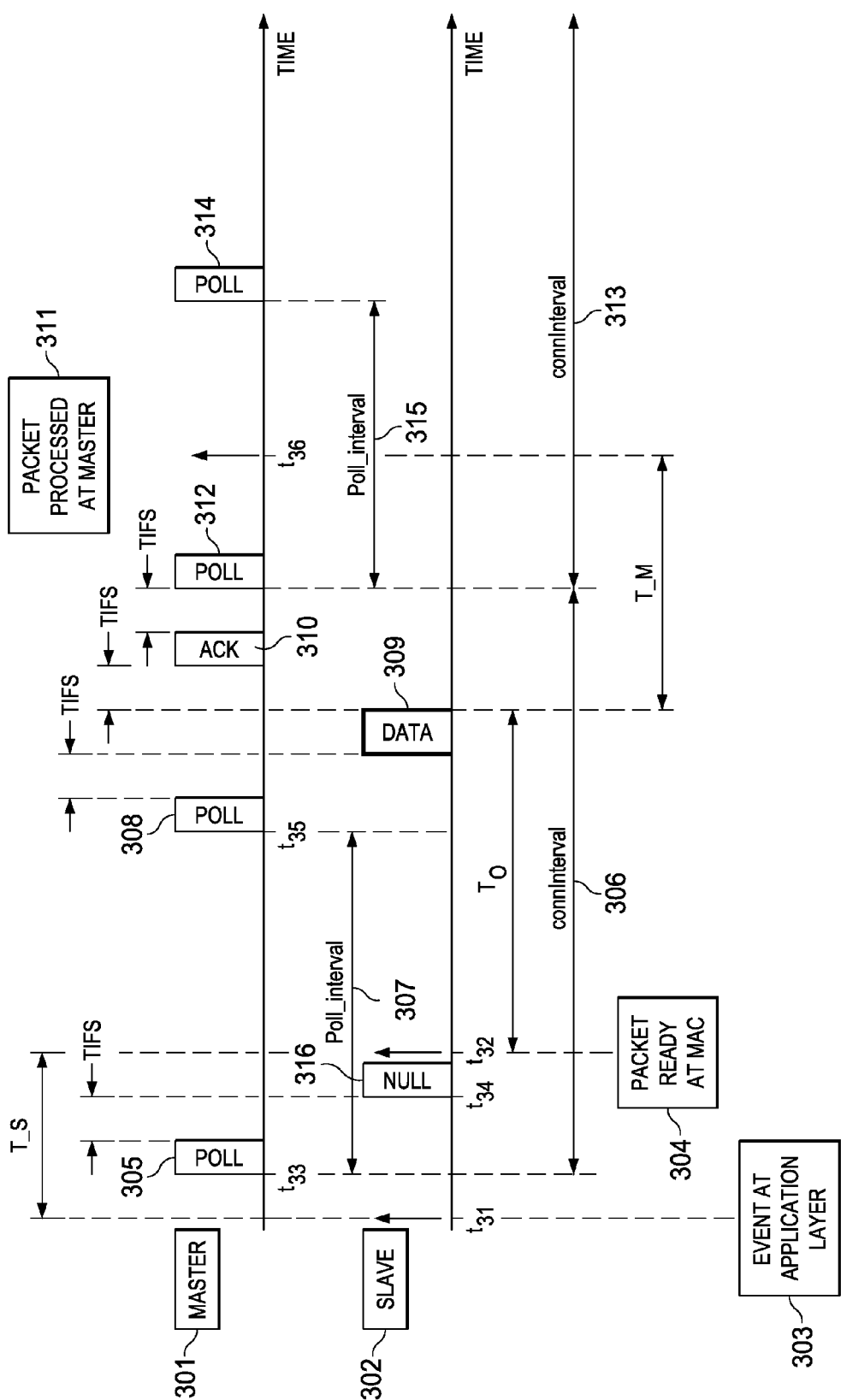

FIG. 3 illustrates a frame exchange between a master device and a slave device using multiple polls within one connection interval.

Figure 4:
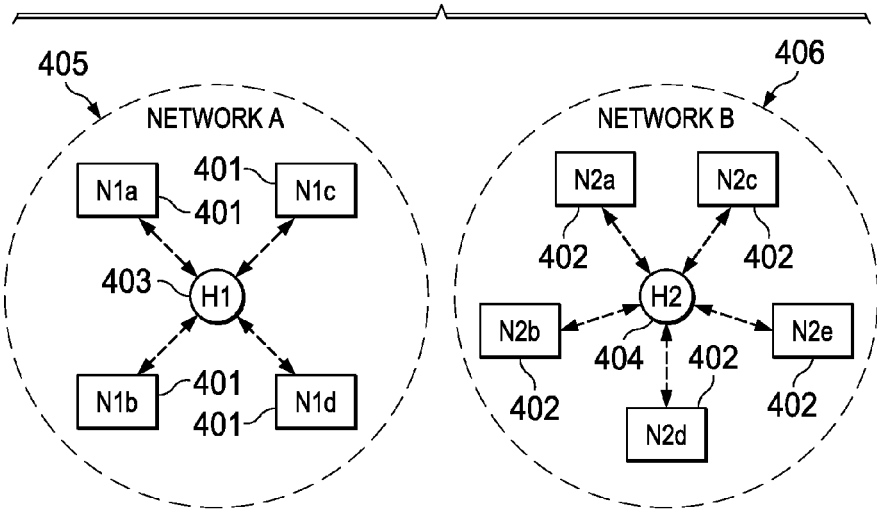

FIG. 4 is a block diagram illustrating a network topology employing embodiments of the invention.

Figure 5:
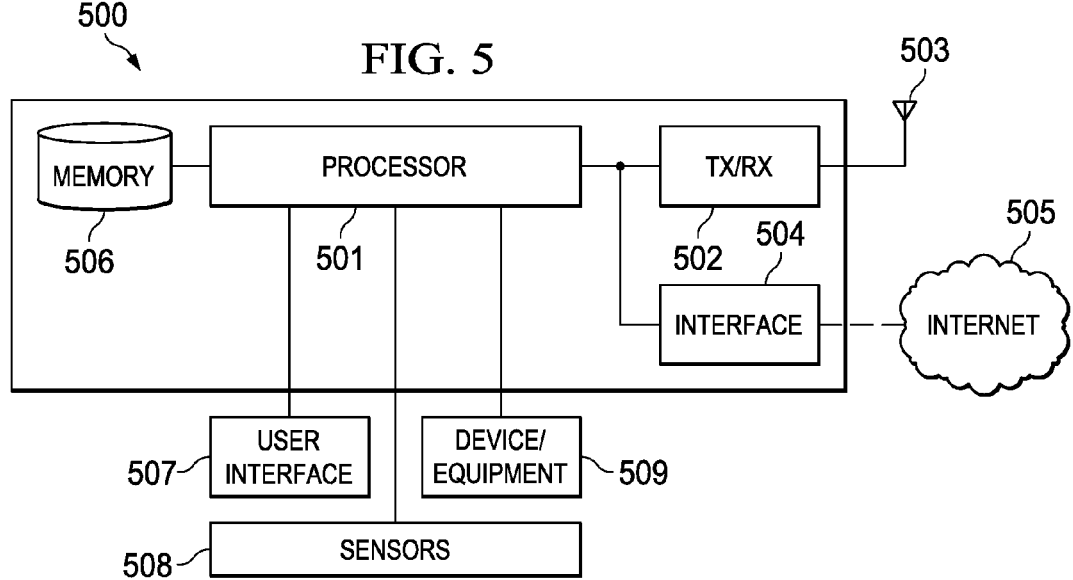

FIG. 5 is a block diagram of an exemplary embodiment of a device implementing embodiments of the invention.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates a frame exchange between a master device 101 and a slave device 102. An event 103 occurs at an application layer of slave 102. The event 103 may be, for example, a sensor detection, calculation result, elapsed timer, or any other event that triggers a need to send or report information to master 101. Event 103 occurs at time $t_{11}$. Data associated with event 103 on the application layer is used to generate a data packet 104 that is available at the MAC layer at time $t_{12}$. The duration between the event occurrence at $t_{11}$ and when the packet is available on the MAC layer at $t_{12}$ is defined as $T_S$ (i.e., processing time for slave 102).

Poll frame 105 is transmitted by master 101 at time $t_{13}$. When slave 102 receives poll 105, it has a data packet 104 ready for transmission. Data packet 104 is used to create data frame 106, which is transmitted by slave 102 at time $t_{14}$. The interval following reception of one frame and before another frame is transmitted is defined as a time inter-frame space (TIFS). Data frame 106 is transmitted a TIFS interval after poll 105.

Acknowledgement (ACK) frame 107, which also acts as an additional poll frame, is transmitted by master 101 at time $t_{15}$, which occurs a TIFS interval after receipt of data frame 106. The received data frame 106 is available as a packet 108 on the application layer of master 101 at time $t_{16}$. A data frame or null data frame is sent as a response to the acknowledgement/poll frame (not shown). The duration between reception of the data frame and when the packet is available on the application layer at $t_{16}$ is defined as $T_M$ (i.e., processing time for master 101).

The master transmits poll frames 105 at the assigned connection interval (connInterval) 109. Accordingly, a second poll frame 110 is transmitted at time $t_{17}$.

FIG. 1 illustrates a best case scenario in which there is an immediate successful transmission of a data packet by the slave device upon receipt of a poll frame from the master device. In this scenario, the first data transmission from the slave device occurs without delay because it is transmitted soon after the data was ready at the MAC layer of the slave device. As long as the data packet is available before the TIFS interval elapses after the poll frame is transmitted by the master device, the system will incur no delay.

The minimum delay for this scenario (MinDelay) between event 103 on the slave device and availability of the related packet 108 on the master device is:

$$\text{MinDelay} < T_S + T_M + T_{data} \qquad \text{(Eq. 1)}$$

where $T_{data}$ is the transmission time for data frame 106.

FIG. 2 illustrates a frame exchange between a master device 201 and a slave device 202 with missing and failed slave transmissions. Event 203 occurs at an application layer of slave 202 at time $t_{21}$. At time $t_{22}$—after interval $T_S$—data associated with event 203 is available as data packet 204 at the MAC layer. Poll frame 205 is transmitted by master 201 at time $t_{23}$. At time $t_{24}$, after slave 202 has received poll 205 and waited the TIFS interval, the data packet is not ready for transmission. Accordingly, under the current BLE protocol, slave 202 transmits a null data frame 216 during connection interval 206. No acknowledgement frame is sent by master 201.

Master 201 sends poll frame 207 at the start of new connection interval 208. However, in this example, data frame 209 sent by slave 202 fails and is not received properly or at all by master 202.

Master 201 sends another poll frame 210 at the start of connection interval 211. Slave 202 has data ready to send and transmits data frame 212 a TIFS interval after receiving poll frame 210. Master 201 successfully receives data frame 212 and may send acknowledgement frame 213 a TIFS interval after receipt of data frame 212. Although acknowledgement frame 213 frame is depicted in FIG. 2, master 201 may decide not transmit that frame. The received data frame 212 is finally available as a packet 214 on the application layer of master 201 at time $t_{25}$.

FIG. 2 illustrates a worst case scenario for a connection that supports a latency interval of two missing frames. Here, the data packet was not ready to transmit in the first connection interval, the data frame failed in the second connection interval, but the data packet was successfully received after a first retry. This situation results in the system incurring a much longer delay compared to FIG. 1. The maximum delay (MaxDelay) in this situation can be shown as:

$$\text{MaxDelay} = T_S + T_M + 2^* \text{connInterval} + T_{data} + T_{poll} + \text{TIFS} - T_{overlap} \qquad \text{(Eq. 2)}$$

where $T_{overlap}$ represents the interval (215) during which $T_S$ overlaps the first connection interval 206.

The potential delays present in the existing BLE protocol are too large to support stringent QoS use cases. BLE can be enhanced by adding multi-poll and/or modified connection interval features as described below. These modifications allow the slave device to send data frames with a less delay than presently available in the existing BLE protocol.

Multi-Poll Transmission

FIG. 3 illustrates a frame exchange between a master device 301 and a slave device 302 using multiple polls within one connection interval. Similar to FIG. 2, event 303 occurs at an application layer of slave 302 at time $t_{31}$. At time $t_{32}$—after interval $T_S$—data associated with event 303 is available as data packet 304 at the MAC layer. Poll frame 305 is transmitted by master 301 at time $t_{33}$. At time $t_{34}$, after slave 302 has received poll 305 and waited the TIFS interval, the data packet is not yet ready for transmission. Accordingly, slave 302 transmits a null frame 316 at time $t_{34}$.

In the enhanced BLE protocol used herein, multiple polls are transmitted during one connection interval. The polls are separated by a poll interval (307) within each connection interval. Accordingly, before the end of connection interval 306, a new poll frame 308 is transmitted by master 301 at time $t_{35}$. Data frame 309 is now ready and transmitted by slave 302 a TIFS interval after receiving poll frame 308. Master 301 may transmit acknowledgement frame 310 in response to receiving data frame 309. The received data frame 309 is available as a packet 311 on the application layer of master 301 at time $t_{36}$.

Master 301 sends another poll frame 312 at the start of new connection interval 313. If no data frame is transmitted or received following the first poll frame 312, then another poll frame 314 is transmitted after a poll interval duration 315.

In other embodiments, two or more polls may be transmitted within each connection interval. The number of polls within each connection interval may be determined based upon the QoS desired for a particular connection.

In further embodiments, the poll interval may be determined based upon the desired QoS for the connection. The number of polls transmitted within the connection interval may then be determined by the poll interval selected for a particular connection. In some embodiments, the poll interval may vary within the connection interval. For example, the poll interval may be progressively shortened or lengthened as time elapses within the connection interval (i.e., the poll frames may be transmitted with increasing or decreasing frequency within one connection interval). In other embodiments, the poll interval may vary from one connection interval to another. A first poll interval may be used in a first connection interval, and a second poll interval is used in a next connection interval. The second poll interval may be shorter or longer than the first poll interval depending, for example, on whether or not a data frame was received during the first connection interval.

When multiple polls may be sent within a connection interval, the master will transmit polls at least until a data frame is received. Additional polls within the same connection interval may or may not be transmitted after the data frame is received. In one embodiment, after a data frame is received in a connection interval, no additional poll frames are transmitted by the master. In other embodiments, poll frames continue to be transmitted at poll intervals without regard to whether a data frame has already been received during the connection interval.

The maximum delay ($\text{MaxDelay}_{MP}$) for the multiple-poll protocol illustrated in FIG. 3 is:

$$\text{MaxDelay}_{MP} = T_S + T_O + T_M = T_S + \text{Poll\_interval} + T_{data} + T_M \qquad \text{(Eq. 3)}$$

where $T_O$ is the interval between when the data packet is ready to transmit at the slave to when the data frame is received at the master.

In the worst case, the interval from the start of a connInterval to packet read at MAC is equivalent to Poll+TIFS.

To achieve a target packet error rate (PER) for a given frame error rate (FER), the Poll_interval can be calculated using the steps below:

$$\text{PER} = \text{FER}^{(N-1)}(1-\text{FER}) \qquad \text{(Eq. 4)}$$

where N is the number of data packet transmissions required from the slave device for successful reception at the master device. The example illustrated in FIG. 3 shows the case for N=1.

Equation 4 can be rewritten in terms of N:

$$N = 1 + \left(\frac{\log\left(\frac{PER}{(1-FER)}\right)}{\log FER}\right) \quad \text{(Eq. 5)}$$

The poll interval parameter can be calculated as follows:

$$\text{Poll\_interval} \leq [\text{Jitter} - (N-1)*T_{data}]/N \quad \text{(Eq. 6)}$$

where Jitter is the jitter parameter set forth in a desired QoS.

Equation 6 can be rewritten as:

$$\text{Poll\_interval} = \frac{\left[\text{Jitter} - \left(\frac{\log\left(\frac{PER}{(1-FER)}\right)}{\log FER}\right)*T_{data}\right]}{\left[1 + \frac{\log\left(\frac{PER}{(1-FER)}\right)}{\log FER}\right]} \quad \text{(Eq. 7)}$$

In a more general form, Equation 7 can be rewritten as:

$$\text{Poll\_interval} = \max\left\{\begin{array}{l}(T_{poll}+T_{data}+2*TIFS),\\ \dfrac{\left[\text{Jitter} - \left(\frac{\log\left(\frac{PER}{(1-FER)}\right)}{\log FER}\right)*T_{data}\right]}{\left[1 + \frac{\log\left(\frac{PER}{(1-FER)}\right)}{\log FER}\right]}\end{array}\right\} \quad \text{(Eq. 8)}$$

For a given QoS, comprising, for example, a desired delay, packet error rate, frame error rate, and jitter, the master may select an appropriate poll interval using Equation 8.

Modified Connection Interval

In another embodiment, instead of transmitting multiple poll frames within a connection interval, the duration of the connection interval itself may be selected based upon desired QoS parameters. For example, the connection interval may be reduced to accommodate delay and jitter values.

As noted above, in Equation 2, the maximum delay due to late data frame availability and failed data frames is:

$$\text{MaxDelay} = T_S + T_M + 2*\text{connInterval} + T_{data} + T_{poll} + TIFS - T_{overlap} \quad \text{(Eq. 9)}$$

This maximum delay (MaxDelay$_{CI}$) for a shortened connection interval may be approximated as:

$$\text{MaxDelay}_{CI} \approx T_S + T_M + 2*\text{connInterval} + T_{data} \quad \text{(Eq. 10)}$$

Hence, the connection interval (connInterval) can be approximated as:

$$\text{connInterval} = [\text{Jitter} - T_{data}]/2 \quad \text{(Eq. 11)}$$

which is the same as a poll interval with one additional retry.

To achieve a target PER for a given FER, the connection interval may be calculated using the following steps:

$$PER = FER^{(N-1)}(1-FER) \quad \text{(Eq. 12)}$$

Solving for N in Equation 12 yields:

$$N = 1 + \left(\frac{\log\left(\frac{PER}{(1-FER)}\right)}{\log FER}\right) \quad \text{(Eq. 13)}$$

The connection interval can be calculated as:

$$\text{connInterval} = \quad \text{(Eq. 14)}$$

$$\text{floor}\left\{\frac{\left[\text{Jitter} - \left(\frac{\log\left(\frac{PER}{(1-FER)}\right)}{\log FER}\right)*T_{data}\right]}{\left[1 + \frac{\log\left(\frac{PER}{(1-FER)}\right)}{\log FER}\right]}\right\}*\text{MINconnInterval}$$

where MINconnInterval is the minimum connection interval, which is 1.25 ms for BLE.

At a minimum, the connection interval must be long enough to allow transmission of poll, data, and acknowledgement frames and corresponding time inter-frame space, which can be represented as:

$$\text{MINconnInterval} = T_{poll} + T_{data} + 2*TIFS \quad \text{(Eq. 15)}$$

The enhanced BLE protocol may address lost connection intervals as follows. If a predetermined number of consecutive poll frames, such as two poll frames, are received in error by the slave, then the connection interval is considered lost by the slave device. The same logic applies to the master device. In addition to the multi-poll and adaptive connection interval approaches described above, the master may detect if the slave has lost the connection interval. To do this, the slave may be required to transmit a frame—even if it contains no data or is empty—in response to a predetermined number (m) poll frames so that the master is notified on a regular basis that the slave has maintained the connection interval.

An example use case for an enhanced BLE protocol is in mobile health and the low energy wireless technologies, such as body area networks (BAN). While the main objective of these networks that utilize BLE and BAN technologies is robust and secure delivery of information in health networks, it is also important that they support stringent QoS requirements for medical health applications.

For example, a particular use case is an electrocardiogram (ECG) sensor node that communicates with a hub that that is collocated with an ultrasound scanner. The objective is to synchronize the heartbeats with ultrasound scanning To achieve this, the ECG sensor is expected to handle a heartbeat rate range of 30-200 Hz. The QoS requirements for the example system are:

Latency (delay)=20 ms;
Jitter<5 ms; and
Frame Error Rate (FER)=10%.

While these specific parameters are used to illustrate this particular example, it will be understood that other systems with varied QoS parameters may also be supported as described herein.

Service parameters for this example case may be, for example:

Heartbeat rate: 30-200 Hz;
Each heartbeat produces a MAC frame payload of 2 bytes
One-byte used as a heartbeat sequence number
One-byte used as an application or heartbeat identifier;

Node/cardiac trigger data rate: 30-200 data type frames per second;
Node generates a data type frame every 5-33 ms;
Node/slave processing time ($T_S$): ≤4 ms; and
Hub/master processing time ($T_M$): ≤4 ms
The BLE protocol parameters for such a system may be:
Poll and ACK durations: 80 μs;
Data duration ($T_{data}$) of the two-byte payload: 152 μs;
Time Inter Frame Spacing (TIFS): 150 μs; and
Connection interval (connInterval) range: 7.5 ms-32.5 ms.
Applying Equation 1 above, the minimum delay (MinDelay) for a system using an existing BLE protocol is:

$$\text{Min}Delay < T_S + T_M + 2*TIFS + T_{data} < \qquad \text{(Eq. 16)}$$
$$4 + 4 + 2*0.150 + .152 = 8.452$$

Applying Equation 2 above, the maximum delay (MaxDelay) for this system using a 7.5 ms connection interval and assuming that $T_{overlap} \approx T_{poll}+\text{TIFS}$ (i.e., these terms cancel out) is:

$$\text{Max}Delay = T_S + T_M + 2*connInterval + \qquad \text{(Eq. 17)}$$
$$T_{data} + T_{poll} + TIFS - T_{overlap}$$
$$= 4 + 4 + 2*7.5 + 0.152 + 0 = 23.152 \approx 23$$

Hence, the delay and jitter requirements are not satisfied using the existing BLE protocol because:

Delay>20 ms

Jitter=23−8.452=14.548 ms>5 ms

Even if the first transmission shown in FIG. 2 was successful (i.e., data frame 209 was successfully received at the master, so only one connection interval elapsed), the existing protocol does not meet the QoS requirements because:

Delay≈15.5 ms (i.e., 23 ms−7.5 ms)

Jitter=15.5 ms−8.452 ms>5 ms

Therefore, it is clear that the existing BLE protocol cannot support stringent QoS requirements for this wireless cardiac trigger scenario.

However, if the above-described modifications to the BLE protocol are used, then the system will provide QoS support for this scenario.

For example, a multi-poll approach may be used so that data can be sent to the master at faster intervals. The multi-poll approach has the same minimum delay of 8.452 ms for the case where data is ready to send when the poll frame arrives at the node. However, applying Equation 3, the maximum delay ($\text{MaxDelay}_{MP}$) for this system using a 5 ms poll interval is:

$$\text{Max}Delay_{MP} = T_S + Poll_{interval} + T_{data} + T_M \qquad \text{(Eq. 18)}$$
$$= 4 + 5 + 0.152 + 4 = 13.152$$

Therefore, the multi-poll approach will support these stringent QoS requirements because:

Delay=13.152<20 ms

Jitter=13.152−8.452=4.7<5 ms

Similarly, if a shortened connection interval is used—such as a connection interval of 5 ms—then the system will also support the stringent QoS requirements.

Applying Equation 11, the connection interval (connInterval) can be approximated as:

$$connInterval = \frac{[\text{Jitter} - T_{data}]}{2} \qquad \text{(Eq. 19)}$$
$$= \frac{[5 - 0.152]}{2} = 2.424$$

Applying Equation 10, the maximum delay ($\text{MaxDelay}_{CI}$) for this shortened connection interval system is:

$$\text{Max}Delay_{CI} \approx T_S + T_M + 2*connInterval + T_{data} \qquad \text{(Eq. 20)}$$
$$= 4 + 4 + 2*2.424 + 0.152 = 13.152$$

Therefore, the shortened connection interval approach will support these stringent QoS requirements because:

Delay=13.152<20 ms

Jitter=13.152−8.452=4.7<5 ms

FIG. 4 is a block diagram illustrating a network topology employing embodiments of the invention. Nodes 401, 402 and hubs 403, 404 are organized into logical sets, referred to as networks. In the illustrated embodiment, there is only one hub in a network, but the number of nodes in a network may vary. For example, network A 405 comprises hub 403 and plurality of nodes 401, and network B 406 comprises hub 404 and plurality of nodes 402. In one embodiment, data is exchanged within the same network using an enhanced Bluetooth Low Energy (BLE) protocol described herein. The hubs 403, 404 and respective nodes 401, 402 may communicate using a multi-poll and/or a shortened connection interval embodiment to support stringent QoS parameters.

FIG. 5 is a block diagram of an exemplary embodiment of a device 500 implementing embodiments of the invention. Device 500 may be used as a node 401, 402 and/or a hub 403, 404 in FIG. 4. In one embodiment, device 500 is a hub, gateway, or controller controlling and communicating with one or more nodes or with other hubs using an enhanced BLE protocol. In another embodiment, device 500 is an enhanced BLE protocol wireless node operating on, in, or around a human or non-human body and communicating with a hub or another node to service one or more applications, such as medical services, consumer electronics, and personal entertainment.

Processor 501 processes data exchanged with other nodes or hubs via transceiver 502 and antenna 503 and/or via wired interface 504 coupled to Internet or another network 505. Processor 501 may be a software, firmware, or hardware based device or a combination thereof. Processor 501 may also generate and process messages sent to, and received from, another device, such as using a multi-poll and/or a shortened connection interval embodiment to support stringent QoS parameters as described herein.

Memory 506 may be used to store data packets, connection intervals, poll intervals, and/or other parameters of an enhanced BLE system. Memory 506 may also be used to store computer program instructions, software and firmware used by processor 501. It will be understood that memory 506 may be any applicable storage device, such as a fixed or removable RAM, ROM, flash memory, or disc drive that is separate from or integral to processor 501.

Device 500 may be coupled to other devices, such as user interface 507, sensors 508, or other devices or equipment 509. Device 500 may be adapted to operate in a body area network either as a node or as a hub controlling a plurality of nodes and coordinating with other hubs for coexistence. Sensors 508 may be used, for example, to monitor vital patient data, such as body temperature, heart rate, and respiration. Equipment 509 may be, for example, a monitor or other device that receives and analyzes signals, such as a patient's temperature, heart rate, and respiration, from another node. Alternatively, equipment 509 may be a device for providing a service to a patient, such as controlling an intravenous drip, respirator, or pacemaker.

It will be understood that the networks 405, 406 in FIG. 4 and the device 500 in FIG. 5 are presented for illustrative purposes only and are not intended to limit the scope of the systems or devices that are capable of employing the unscheduled access procedure described herein.

Many of the functions described herein may be implemented in hardware, software, and/or firmware, and/or any combination thereof. When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

The software code segments may be stored in any volatile or non-volatile storage device, such as a hard drive, flash memory, solid state memory, optical disk, CD, DVD, computer program product, or other memory device, that provides computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method, comprising:
   in a first device adapted to communicate using a Bluetooth low energy protocol, selecting a connection interval for use in communicating with a second device;
   generating poll frames to be transmitted to the second device; and
   transmitting two or more poll frames during the connection interval, the poll frames spaced by a poll interval based on a maximum jitter value (Jitter) and selected using the formula:
   Poll Interval=max[(Tpoll+Tdata+2*TIFS),[Jitter−log (PER/(1−FER))/log(FER)*Tdata]/[1+log (PER/(1−FER))/log(FER)])]; where Tpoll is a duration of the poll frame, Tdata is a duration of a data frame, TIFS is an inter-frame spacing value, PER is a packet error rate, and FER is a frame error rate.

2. The method of claim 1, further comprising:
   receiving a data frame from the second device, the data frame transmitted in response to a poll frame; and
   ceasing transmission of additional poll frames within the connection interval after receiving the data frame.

3. The method of claim 1, further comprising:
   receiving a data frame from the second device, the data frame transmitted in response to a poll frame; and transmitting additional poll frames within the connection interval after receiving the data frame.

4. The method of claim 1, further comprising:
   receiving at least one frame from the second device in response to a sequence of poll frames, the sequence of poll frames including a selected number of poll frames, the at least one frame indicating at least in part that the connection interval is not lost.

5. A method, comprising:
   in a first device adapted to communicate using a Bluetooth low energy protocol, selecting a connection interval for use in communicating with a second device, the connection interval selected based upon a quality of service requirement and selected using the formula:
   Connection Interval=floor {[Jitter−log (PER/(1−FER))/ log(FER)*Tdata]/[1+log (PER/(1−FER))/log(FER) *MinCI])}*MinCI;
   where Jitter is a maximum jitter value, Tdata is a duration of a data frame, PER is a packet error rate, FER is a frame error rate, and MinCI is a minimum acceptable connection interval length;
   generating a poll frame to be transmitted to the second device; and
   transmitting the poll frame during the connection interval.

6. The method of claim 5, further comprising:
   receiving at least one frame from the second device in response to a sequence of poll frames, the sequence of poll frames including a selected number of poll frames, the at least one frame indicating at least in part that the connection interval is not lost.

7. A device, comprising:
   a circuit for sending signals to and receiving signals from a second device using a Bluetooth low energy link layer;
   a memory for storing Quality of Service parameters; and
   a processor adapted to perform operations on the signals sent to or received from the second device, the processor operating to:
   select a connection interval for use in communicating with the second device, wherein a poll interval is selected using the formula:
   Poll Interval=max [(Tpoll+Tdata+2*TIFS), [Jitter−log (PER/(1−FER))/log(FER)*Tdata]/[1+log (PER/(1−FER))/log(FER)])];
   where Jitter is a maximum jitter value, Tpoll is a duration of the poll frame, Tdata is a duration of a data frame, TIFS is an inter-frame spacing value, PER is a packet error rate, and FER is a frame error rate;
   generate poll frames to be transmitted to the second device; and
   transmit two or more poll frames during the connection interval, the poll frames spaced by the poll interval.

8. The device of claim 7, wherein the processor is further adapted to:
   receive a data frame from the second device, the data frame transmitted in response to a poll frame; and cease transmission of additional poll frames within the connection interval after receiving the data frame.

9. The device of claim 7, wherein the processor is further adapted to:
receive a data frame from the second device, the data frame transmitted in response to a poll frame; and
transmit additional poll frames within the connection interval after receiving the data frame.

10. A device, comprising:
a circuit for sending signals to and receiving signals from a second device using a Bluetooth low energy link layer;
a memory for storing Quality of Service parameters; and
a processor adapted to perform operations on the signals sent to or received from the second device, the processor operating to:
select a connection interval for use in communicating with the second device, the connection interval is based upon a quality of service requirement and selected using the formula:
Connection Interval=floor {[Jitter−log (PER/(1−FER))/log(FER)*Tdata]/[1+log (PER/(1−FER))/log(FER)*MinCI])}*MinCI;
where Jitter is a maximum jitter value, Tdata is a duration of a data frame, PER is a packet error rate, FER is a frame error rate, and MinCI is a minimum acceptable connection interval length;
generate a poll frame to be transmitted to the second device; and
transmit the poll frame during the connection interval.

* * * * *